United States Patent
Majumdar et al.

(10) Patent No.: US 9,619,536 B2
(45) Date of Patent: *Apr. 11, 2017

(54) DATA INTEGRATION USING AUTOMATED DATA PROCESSING BASED ON TARGET METADATA

(71) Applicant: International Business Machines Corporation, Armonk, NY (US)

(72) Inventors: Gautam Majumdar, Wappingers Falls, NY (US); Tarun K. Saha, Fishkill, NY (US); Michael Q. Wang, Irving, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/927,641

(22) Filed: Oct. 30, 2015

(65) Prior Publication Data

US 2016/0063082 A1     Mar. 3, 2016

Related U.S. Application Data

(63) Continuation of application No. 13/832,645, filed on Mar. 15, 2013, now Pat. No. 9,251,226.

(51) Int. Cl.
*G06F 17/30* (2006.01)
(52) U.S. Cl.
CPC .. *G06F 17/30563* (2013.01); *G06F 17/30339* (2013.01); *G06F 17/30371* (2013.01);
(Continued)
(58) Field of Classification Search
CPC ......... G06F 17/30563; G06F 17/30592; G06F 17/30339; G06F 17/30371; G06F 17/30569; G06F 17/30598
(Continued)

(56) References Cited

U.S. PATENT DOCUMENTS 7,747,563 B2   6/2010 Gehring
7,941,397 B2   5/2011 Wilms et al.
(Continued)

OTHER PUBLICATIONS

N. Bassiliades et al., InterBase-KB: integrating a knowledge base system with a multidatabase system for data warehousing; 2003, vol. 15, 1188-1205.*

(Continued)

*Primary Examiner* — Jean B Fleurantin
(74) *Attorney, Agent, or Firm* — John R. Pivnichny; Hunter E. Webb; Keohane & D'Alessandro PLLC

(57) ABSTRACT

Approaches for data integration between multiple IT sources using automated data processing based on target metadata are provided. Specifically, an integration component is configured to load a mapped data set into a table with delta processing based on a configuration object containing, e.g., the source data location, target table name, and source to target mapping. The integration component uses the target metadata to validate data, identify changes, generate the necessary database programming language (e.g., structured query language (SQL)), and run the database programming language with data binding to perform the actual data updates. The integration component leverages the data target metadata to automate the processing of source data, thus providing a way to validate the data, and identify delta changes at the field level between the source and target. This significantly reduces the overall development effort, while providing consistency in record handling and error reporting.

15 Claims, 3 Drawing Sheets

(52) U.S. Cl.
CPC .. *G06F 17/30569* (2013.01); *G06F 17/30592* (2013.01); *G06F 17/30598* (2013.01)

(58) Field of Classification Search
USPC ........................ 707/602, 634, 758, 769, 770
See application file for complete search history.

(56) References Cited

U.S. PATENT DOCUMENTS

| | | | |
|---|---|---|---|
| 8,219,518 B2 | 7/2012 | Jin et al. | |
| 8,903,762 B2* | 12/2014 | Jin et al. | ...................... 707/602 |
| 9,148,461 B2* | 9/2015 | Werr | |
| 2007/0074155 A1 | 3/2007 | Ama et al. | |
| 2008/0168082 A1 | 7/2008 | Jin et al. | |
| 2008/0208855 A1 | 8/2008 | Lingenfelder et al. | |
| 2012/0254103 A1 | 10/2012 | Cottle et al. | |
| 2015/0074217 A1* | 3/2015 | Werr | ............................ 709/212 |

OTHER PUBLICATIONS

Fleurantin, U.S. Appl. No. 13/832,645, Office Action dated Jan. 2, 2015, 10 pages.
Fleurantin, U.S. Appl. No. 13/832,645, Final Office Action dated Jul. 13, 2015, 9 pages.
Fleurantin, U.S. Appl. No. 13/832,645, Notice of Allowance dated Sep. 30, 2015, 11 pages.
Bleiholder et al., Complement Union for Data Integration, 2010, IEEE, pp. 183-186.

\* cited by examiner

DATA INTEGRATION USING AUTOMATED DATA PROCESSING BASED ON TARGET METADATA

The present patent document is a continuation of U.S. patent application Ser. No. 13/832,645, filed Mar. 15, 2013, entitled "DATA INTEGRATION USING AUTOMATED DATA PROCESSING BASED ON TARGET METADATA", the disclosure of which is incorporated herein by reference.

FIELD OF THE INVENTION

The present invention relates generally to data processing, and more particularly to automated data processing based on target metadata in a data integration process.

BACKGROUND OF THE INVENTION

In many large IT environments, requirements exist for transporting data in and out of individual systems (e.g., data bridges) as a form of integration. Tools used to transport data generally fall into the category of ETL (extract, transform, load) tools. ETL is a process in data warehousing that involves extracting data from outside sources, transforming the data in accordance with particular business needs, and loading the data into a data warehouse. An ETL process typically begins with a user defining a data flow that defines data transformation activities that extract data from, e.g., flat files or relational tables, transform the data, and load the data into a data warehouse, data mart, or staging table(s). A data flow, therefore, typically includes a sequence of operations modeled as data flowing from various types of sources, through various transformations, and finally ending in one or more targets.

Prior art ETL approaches require the creation of multiple redundant processes, e.g., one for each table or data set. This is especially true when using GUI tools of ETL products. The GUI tools make it very easy to move data between systems. However, when there are complex requirements, such as the need to identify what has changed between the source and the target, the ETL tools, and even custom scripts, require a lot of modification. This results in the exponential growth of the code base (or process nodes).

Therefore, when developing a data bridge between two information systems, one of the biggest challenges is the handling of individual elements. Most ETL tools or batch frameworks provide powerful functions, yet a developer still has to code individually on each data object to perform common tasks such as data validation, record comparison, etc. The process is error prone due to typos, changes in requirements (e.g., go back and adjust every object), etc. Accordingly, what is needed is a solution that solves at least one of the above-identified deficiencies.

SUMMARY OF THE INVENTION

In general, embodiments of the invention provide data integration between multiple IT sources using automated data processing based on target metadata. Specifically, an integration component is configured to load a mapped data set into a table with delta processing based on a configuration object containing, e.g., the source data location, target table name, and source to target mapping. The integration component uses the target metadata to validate data, identify changes, generate the necessary database programming language (e.g., structured query language (SQL)), and run the database programming language with data binding to perform the actual data updates. The integration component leverages the data target metadata to automate the processing of source data, thus providing a way to validate the data, and identify delta changes at the field level between the source and target. This significantly reduces the overall development effort, while providing consistency in record handling and error reporting.

In one embodiment, there is a method for data integration using automated data processing based on target metadata. In this embodiment, the method comprises the computer implemented steps of: defining a set of data objects built from target metadata; sorting the set of data objects built from target metadata; sorting and validating source data; comparing the set of data objects to the sorted and validated source data to identify differences; generating a set of programming language statements to map the source data based on the target metadata; and loading the mapped source data to a target storage destination.

In a second embodiment, there is a system for data integration using automated data processing based on target metadata. In this embodiment, the system comprises at least one processing unit, and memory operably associated with the at least one processing unit. An integration component is storable in memory and executable by the at least one processing unit. The integration component comprises an object definer configured to define a set of data objects built from target metadata; a sorter configured to: sort the set of data objects built from target metadata; and sort and validate source data; a comparer configured to compare the set of data objects to the sorted and validated source data to identify differences; a generator configured to generate a set of database programming language statements to map the source data based on the target metadata; and a loader configured to load the mapped source data to a target storage destination.

In a third embodiment, there is a computer-readable storage medium storing computer instructions, which when executed, enables a computer system to provide data integration using automated data processing based on target metadata. In this embodiment, the computer instructions comprise: defining a set of data objects built from target metadata; sorting the set of data objects built from target metadata; sorting and validating source data; comparing the set of data objects to the sorted and validated source data to identify differences; generating a set of programming language statements to map the source data based on the target metadata; and loading the mapped source data to a target storage destination.

In a fourth embodiment, there is a method for deploying a integration component for use in a computer system that provides data integration using automated data processing based on target metadata. In this embodiment, a computer infrastructure is provided and is operable to: define a set of data objects built from target metadata; sort the set of data objects built from target metadata; sorting and validating source data; compare the set of data objects to the sorted and validated source data to identify differences; generate a set of programming language statements to map the source data based on the target metadata; and load the mapped source data to a target storage destination.

Figure 1:
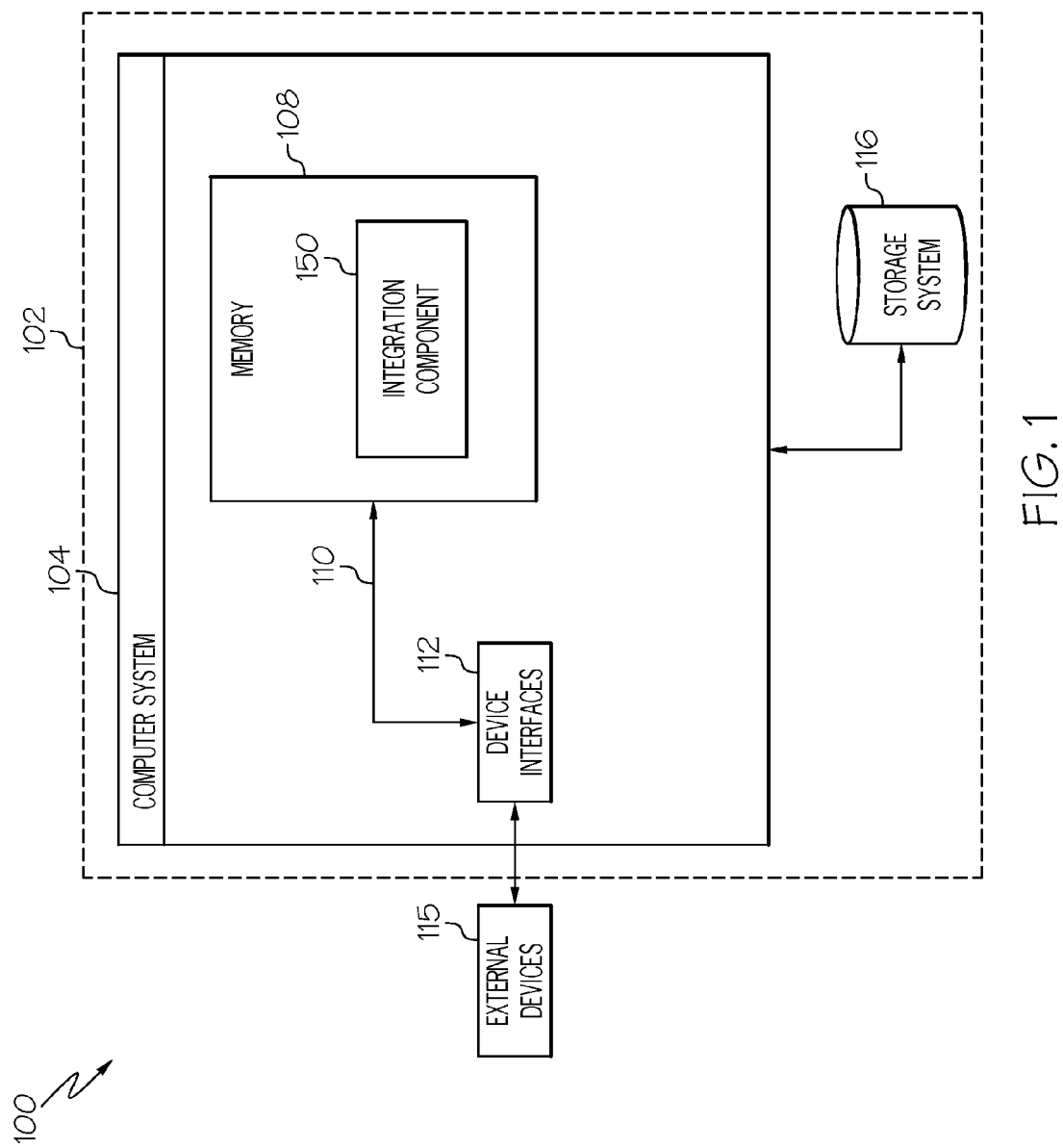
FIG. 1 shows a schematic of an exemplary computing environment in which elements of the present invention may operate.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

The invention will now be described more fully herein with reference to the accompanying drawings, in which exemplary embodiments are shown. Embodiments described herein provide data integration between multiple IT sources using automated data processing based on target metadata. Specifically, an integration component is configured to load a mapped data set into a table with delta processing based on a configuration object containing, e.g., the source data location, target table name, and source to target mapping. The integration component uses the target metadata to validate data, identify changes, generate the necessary database programming language (e.g., structured query language (SQL)), and run the database programming language with data binding to perform the actual data updates. The integration component leverages the data target metadata to automate the processing of source data, thus providing a way to validate the data, and identify delta changes at the field level between the source and target. This significantly reduces the overall development effort, while providing consistency in record handling and error reporting.

This disclosure may be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "computing," "determining," "evaluating," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

Referring now to FIG. 1, a computerized implementation 100 of the present invention will be described in greater detail. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), a cloud-computing environment, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for data integration using automated data processing based on target metadata. It should be understood that any other computers implemented under the present invention may have different components/software, but will perform similar functions. As shown, computer system 104 includes a processing unit 106 capable of communicating with a data center 106. Also, shown is memory 108 for storing an integration component 150, a bus 110, and device interfaces 112.

Processing unit 106 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 106 collects and routes signals representing outputs from external devices 115 (e.g., a graphical user interface operated by an end-user) to integration component 150. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different sensor systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating integration component 150, which is stored in memory 108 and/or storage system 116. While executing computer program code, processing unit 106 can read and/or write data to/from memory 108, storage system 116, and data center 106. Storage system 116 can include VCRs, DVRs, RAID arrays, USB hard drives, optical disk recorders, flash storage devices, and/or any other data processing and storage elements for storing and/or processing data. Although not shown, computer system 104 could also include I/O interfaces that communicate with one or more external devices 115 that enable a user to interact with computer system 104 (e.g., a keyboard, a pointing device, a display, etc.).

Figure 2:
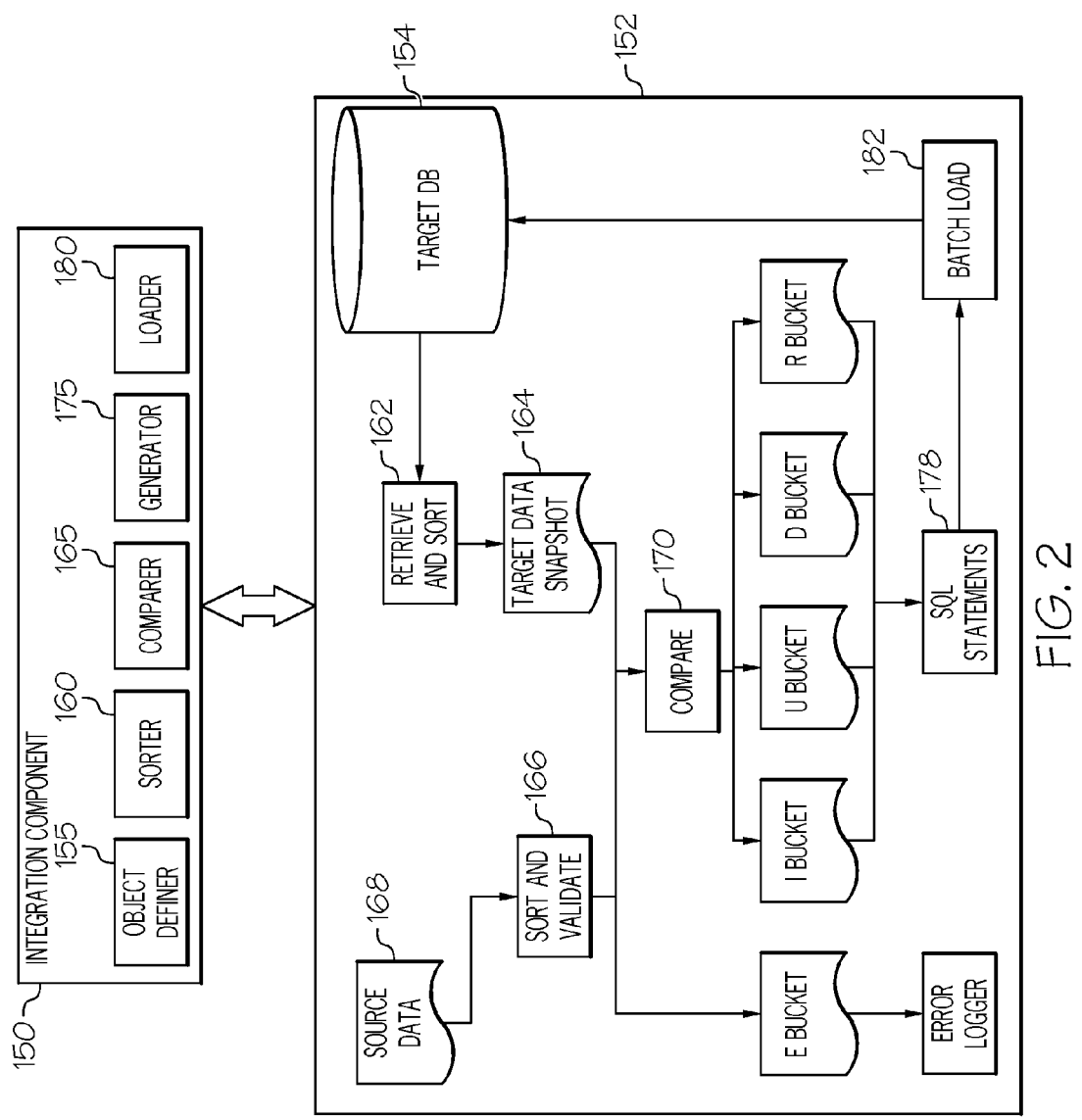
FIG. 2 shows a more detailed view of an integration component that operates in a database IT environment according to embodiments of the invention.

Referring now to FIG. 2, integration component 150 will be described in greater detail. In an exemplary embodiment, integration component 150 operates with an IT environment 152 to provide data integration using automated data processing based on target metadata. Embodiments herein solve one or more problems of the prior art by creating a plurality of generic functional components on top of the metadata in the data target. Integration component 150 handles everything that the metadata can determine, including, but not limited to, data validation, and delta change identification. It will be appreciated that integration component 150 can be used as a stand-alone component, or integrated into an existing ETL tools.

To accomplish this, integration component 150 comprises an object definer 155 configured to define a set of data objects built from target metadata of a target storage destination 154. In one embodiment, object definer 155 is configured to generate a set of objects, e.g., a table definition (i.e., "TableObject") built from target metadata, a column definition (i.e., "TableColumnObject") built from target metadata, and an object representation (i.e., "TableDataObject") of a record based on the table definition and the column definition.

As further shown, integration component 150 comprises a sorter 160 configured to retrieve and sort (162) the set of data objects built from target metadata by object definer 155, and to generate a target data snapshot (164), which represents the whole record set from which TableDataObject is a part of. Sorter 160 is further configured to retrieve, sort, and validate (166) source data 168. In one embodiment, validation ensures that the data is strongly typed, has correct syntax, is within length boundaries, contains only permitted characters, or that numbers are correctly signed and within range boundaries, etc. Sorting is performed on both source data (168) and target data snapshot (164) according to the primary identifier (e.g. Primary Key) of each record in the respective data set using any sorting mechanisms (e.g. Quicksort, Merge Sort), and the primary identifiers have consistent ordering (ascending or descending) throughout the system.

Next, a comparer 165 is configured to compare (170) the set of data objects to the sorted and validated source data 168 to identify differences between the two. In an exemplary embodiment, a delta processing approach is used, which identifies records/objects that get added, deleted, or modified between consecutive data pulls. In this case, comparer 165 performs delta processing to identify the differences between the set of data objects and the sorted and validated source data 168. Based on this, comparer 165 categorizes the data objects into at least one of the following categories/buckets: E: failed validation, to be written to error log (log 4j); I: new records, to be inserted; U: updated records; D: to be deleted; and R: re-insert (previously) logically deleted records.

Next, a generator 175 (e.g., an SQL generator) generates a set of database programming language (e.g., SQL) statements 178 to map source data 168 based on the target metadata. A loader 180 is configured to load the mapped source data to target storage destination 154. In an exemplary embodiment, loader 175 is configured to batch load (182), e.g., using a JDBC (JAVA Database Connectivity API), the mapped source data to target storage destination 154. In this step, the actual SQL statements are run with data binding to do the actual updates to target storage destination 154.

So according to exemplary embodiments herein, when one wants to physically load a mapped data set into a table with delta processing, integration component 150 will handle all the processing. All that is required is to inform integration component 150 the following via a configuration object:

The source data location

Target table name

Source to target mapping (not necessary if an ETL tool is used) Integration component 150 will use the metadata to validate data, identify changes, generate the necessary SQL, and run the actual SQL with data binding to do the actual updates.

Compared with traditional approaches, this new delta processing will provide at least the following benefits: reduced code base (e.g., save up to 90% coding and development time compared with a typical implementation); consistent—all the processes work exactly the same way (e.g. all date fields are validated for proper date format (or blank), and field length is checked against each "char" field); and batch updates—improved performance (e.g., combined with delta, can improve performance by 20+ times in some cases).

As described herein, the present invention allows data integration using automated data processing based on target metadata. It can be appreciated that the approaches disclosed herein can be used within a computer system for data integration using automated data processing based on target metadata, as shown in FIG. 1. In this case, integration component 150 can be provided, and one or more systems for performing the processes described in the invention can be obtained and deployed to computer infrastructure 102. To this extent, the deployment can comprise one or more of: (1) installing program code on a data center device, such as a computer system, from a computer-readable storage medium; (2) adding one or more data center devices to the infrastructure; and (3) incorporating and/or modifying one or more existing systems of the infrastructure to enable the infrastructure to perform the process actions of the invention.

The exemplary computer system 104 may be described in the general context of computer-executable instructions, such as program modules, being executed by a computer. Generally, program modules include routines, programs, people, components, logic, data structures, and so on that perform particular tasks or implements particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Figure 3:
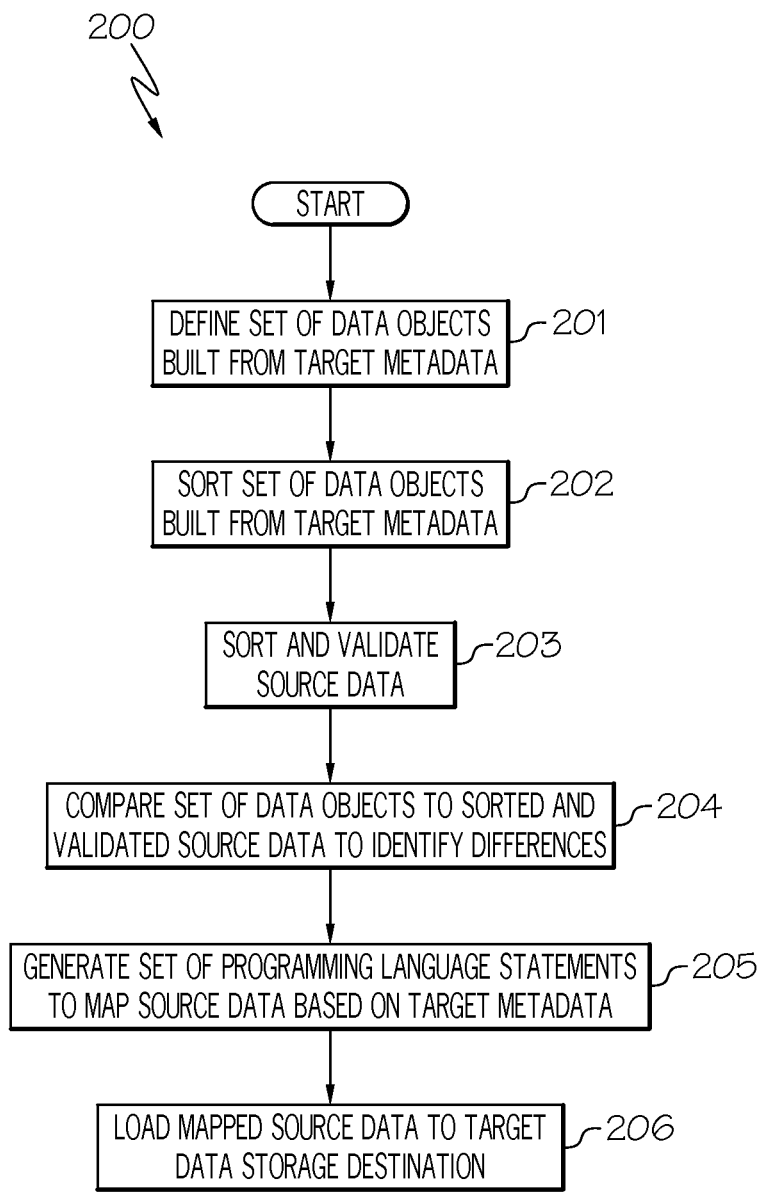
FIG. 3 shows a flow diagram for data integration using automated data processing based on target metadata according to embodiments of the invention.

The program modules carry out the methodologies disclosed herein, as shown in FIG. 3. Shown is a process 200 for data integration using automated data processing based on target metadata, wherein, at 201, a set of data objects built from target metadata are defined. At 202, the set of data objects built from target metadata are sorted. At 203, source data is sorted and validated. At 204, the set of data objects are compared to the source data to identify differences. At 205, a set of programming language statements are generated to map the source data based on the target metadata. At 206, the mapped source data is loaded into the target storage destination and process 200 ends.

The flowchart of FIG. 3 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Many of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network.

Furthermore, as will be described herein, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations.

For example, an implementation of exemplary computer system 104 (FIG. 1) may be stored on or transmitted across some form of computer readable media. Computer readable media can be any available media that can be accessed by a computer. By way of example, and not limitation, computer readable media may comprise "computer storage media" and "communications media."

"Computer-readable storage device" includes volatile and non-volatile, removable and non-removable computer storable media implemented in any method or technology for storage of information such as computer readable instructions, data structures, program modules, or other data. Computer storage device includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided an approach for data integration using automated data processing based on target metadata. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for data integration using automated data processing based on target metadata, the method comprising the computer-implemented steps of:
   defining an intermediate data table that is separate from a target storage destination built from target metadata of the target storage destination containing a set of data objects;
   loading a mapped data set containing a set of source data objects from a source into the intermediate data table based on a configuration object;
   sorting the set of data objects built from target metadata and generating a target data snapshot that represents an entire record set from which the set of data objects is a part;
   sorting and validating source data in the intermediate data table using the target metadata;
   comparing the set of data objects to the sorted and validated source data using delta processing to identify differences using the target metadata;
   generating a set of programming language statements to map the differences in the source data based on the target metadata using the target metadata; and
   loading the mapped source data to a target storage destination using the set of programming language statements.

2. The method according to claim 1, the loading the mapped source data comprising batch loading the mapped source data to the target storage destination.

3. The method according to claim 1, further comprising the computer-implemented step of categorizing the set of data objects based on the comparison of the set of data objects to the sorted and validated source data.

4. The method according to claim 3, further comprising categorizing the data objects into at least one of the following categories: failed validation, new records, updated records, deleted records, and re-inserted records.

5. The method according to claim 1, further comprising performing the delta processing to identify the differences between the set of data objects and the sorted and validated source data.

6. A computer system for data integration using automated data processing based on target metadata, the system comprising:
   at least one processing unit;
   memory operably associated with the at least one processing unit; and
   an integration component storable in memory and executable by the at least one processing unit, the integration component comprising:
      an object definer configured to define an intermediate data table that is separate from a target storage destination built from target metadata of the target storage destination containing a set of data objects;
      a table loader configured to load a mapped data set containing a set of source data objects from a source into the intermediate data table based on a configuration object;
      a sorter configured to:
         sort the set of data objects built from target metadata;
         generating a target data snapshot that represents an entire record set from which the set of data objects is a part; and
         sort and validate source data in the intermediate data table using the target metadata;
      a comparer configured to compare the set of data objects to the sorted and validated source data using delta processing to identify differences using the target metadata;
      a generator configured to generate a set of database programming language statements to map the differences in the source data based on the target metadata using the target metadata; and
      a loader configured to load the mapped source data to a target storage destination using the set of programming language statements.

7. The computer system according to claim 6, the loader further configured to batch load the mapped source data to the target storage destination.

8. The computer system according to claim 6, the comparer further configured to categorize the set of data objects based on the comparison of the set of data objects to the sorted and validated source data.

9. The computer system according to claim 8, the comparer further configured to categorize the data objects into at least one of the following categories: failed validation, new records, updated records, deleted records, and re-inserted records.

10. The computer system according to claim 6, the comparer further configured to perform the delta processing to identify the differences between the set of data objects and the sorted and validated source data.

11. A computer-readable storage hardware device storing computer instructions, which when executed, enables a computer system to provide data integration using automated data processing based on target metadata, the computer instructions comprising:
   defining an intermediate data table that is separate from a target storage destination built from target metadata of the target storage destination containing a set of data objects;
   loading a mapped data set containing a set of source data objects from a source into the intermediate data table based on a configuration object;
   sorting the set of data objects built from target metadata and generating a target data snapshot that represents an entire record set from which the set of data objects is a part;
   sorting and validating source data in the intermediate data table using the target metadata;
   comparing the set of data objects to the sorted and validated source data using delta processing to identify differences using the target metadata;
   generating a set of programming language statements to map the differences in the source data based on the target metadata using the target metadata; and
   loading the mapped source data to a target storage destination using the set of programming language statements.

12. The computer-readable storage device according to claim 11, the computer instructions for loading further comprising instructions for batch loading the mapped source data to the target storage destination.

13. The computer-readable storage device according to claim 11, further comprising computer instructions for categorizing the set of data objects based on the comparison of the set of data objects to the sorted and validated source data.

14. The computer-readable storage device according to claim 13, further comprising computer instructions for categorizing the data objects into at least one of the following categories: failed validation, new records, updated records, deleted records, and re-inserted records.

15. The computer-readable storage device according to claim 11, further comprising computer instructions for performing the delta processing to identify the differences between the set of data objects and the sorted and validated source data.

\* \* \* \* \*